(12) United States Patent
Warsowe (10) Patent No.: US 8,307,851 B2
(45) Date of Patent: Nov. 13, 2012

(54) REGULATING WATER FLOW

(75) Inventor: Marc Warsowe, Redwood City, CA (US)

(73) Assignee: 456Corp, Redwood City, CA (US)

(*) Notice: Subject to any disclaimer, the term of this patent is extended or adjusted under 35 U.S.C. 154(b) by 105 days.

(21) Appl. No.: 12/822,460

(22) Filed: Jun. 24, 2010

(65) Prior Publication Data

US 2011/0001075 A1    Jan. 6, 2011

Related U.S. Application Data

(60) Provisional application No. 61/270,038, filed on Jul. 3, 2009.

(51) Int. Cl.
*F16K 11/02* (2006.01)

(52) U.S. Cl. ............... 137/607; 137/595; 251/295

(58) Field of Classification Search .......... 137/595, 137/607, 862, 865; 251/250, 294, 295
See application file for complete search history.

(56) References Cited

U.S. PATENT DOCUMENTS

| | | | |
|---|---|---|---|
| 289,937 A * | 12/1883 | Smith | 4/672 |
| 946,477 A * | 1/1910 | Wentzell | 137/207.5 |
| 1,364,555 A * | 1/1921 | Hunt | 137/862 |
| 2,467,065 A * | 4/1949 | White | 74/471 R |
| 3,218,023 A * | 11/1965 | Kirkup | 251/38 |
| 3,594,828 A * | 7/1971 | Seek | 251/294 |
| 3,847,210 A * | 11/1974 | Wells | 165/103 |
| 5,230,365 A * | 7/1993 | Woltz et al. | 137/607 |
| 5,263,684 A * | 11/1993 | McGuire | 251/294 |
| 5,322,084 A | 6/1994 | Ghiassian | |
| 5,386,600 A | 2/1995 | Gilbert, Sr. | |
| 5,511,763 A | 4/1996 | Green | |
| 6,886,508 B1 * | 5/2005 | Luffy | 123/73 AD |

FOREIGN PATENT DOCUMENTS

WO    WO 2005/078324 A1    8/2005

* cited by examiner

*Primary Examiner* — John Rivell
*Assistant Examiner* — Time Aigbe
(74) *Attorney, Agent, or Firm* — Walter A. Hackler (57) ABSTRACT

A water flow regulation system includes a pair of water valves having turnable stems for controlling water flow through the valves and a pair of pinions, one fixed to each of the valve stems. A toothed rack is provided which is sized and configured for engagement with the pinions. A housing supports the valves and rack with teeth of both pinions engaging the rack teeth in order that translational movement of the rack causes simultaneous rotation of the pinions with concomitant simultaneous opening and closing of the valves. A remote control and a sheathed cable interconnecting said remote control and the rack are provided for operation of the system.

10 Claims, 7 Drawing Sheets

REGULATING WATER FLOW

The present invention claims priority from U.S. Provisional Application Ser. No. 61/270,038, filed Jul. 3, 2009. This application is incorporated herewith in its entirety into the present application.

FIELD

The invention is generally related to regulating water flow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Faucets and faucet sets are known. Some faucet sets have two separate faucet valves and a valve handle for each faucet valve, one for hot water and one for cold water, respectively. Each valve and handle controls the amount of flow of hot and cold water, respectively, and thereby controls the total flow, as well as the temperature of the water. Today, faucet sets with two faucet valves and two handles typically have only one faucet spout through which mixed hot and cold water is discharged; however, some older dual-valve faucet sets may have two faucet spouts, one for each valve and handle, respectively. Other faucet sets control both the hot water and cold water with a single faucet valve and handle that controls the amount of flow of both hot and cold water in one action, thereby controlling the total flow, as well as the temperature of the water, in one action. Faucet sets with a single faucet valve have one faucet spout, through which the mixed hot and cold water flows.

BRIEF DESCRIPTION OF THE DRAWINGS

In the following drawings like reference numbers are used to refer to like elements. Although the following figures depict various examples of the invention, the invention is not limited to the examples depicted in the figures.

SUMMARY OF THE INVENTION

A water flow regulator in accordance with the present invention generally includes a pair of water valves having turnable stems for controlling water flow through the valves.

A pair of pinions are provided with one fixed to each of the valve stems along with a toothed rack, which is sized and configured for engagement with the pinions.

A housing supports the valves and the rack with the teeth of both pinions in engaging the rack teeth for enabling translational movement of the rack to cause simultaneous rotation of the pinions with the concomitant simultaneous opening and closing of the valves for controlling water flow therethrough.

A remote control is provided and disposed in a spaced apart relationship with the housing along with a sheathed cable interconnecting the remote control and the rack.

More particularly, the remote control may comprise a foot pedal which incorporates a spring for moving the rack, by way of the cable, to close the valve of a non-depression of the foot pedal.

Alternatively, a spring may be disposed in the housing and interconnected with a distal end of the cable for moving the rack to close the valve upon release of the foot pedal.

In an alternative embodiment of the present invention, a pair of water valves having turnable stems for controlling water flow through the valves are provided with the stems being coaxially joined for enabling simultaneous rotation thereof. A housing supports the water valves and a lever is attached to the joined stem for simultaneous rotation of the stems.

A remote control is disposed in a spaced apart relationship with the housing and a sheathed cable interconnects the remote control and the lever.

Preferably, the remote control is a foot pedal which may incorporate a spring for moving the lever via the cable to close the valve upon non-depression of the foot pedal.

Alternatively, a spring may be disposed on the housing and interconnected with the lever for moving the lever to close the valve upon release of the foot pedal.

In either embodiment of the present invention, the valves may be ball valves.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Faucet sets are mentioned in many places in the remainder of this specification. Some examples of faucet sets include, but are not limited to, any water delivery plumbing device comprised of a single faucet valve and handle or a dual faucet value and two handles, plus one or more faucet spouts. For the purpose of this specification, any and all faucet sets may be referred to in the singular as a faucet. In the remainder of this specification, faucet sets may also be referred to simply as faucets. In addition, faucet spouts are mentioned in many places in the remainder of this specification. Examples of faucet spouts include, but are not limited to, a spout, spigot, bibb, bibcock, hydrant, nozzle, stopcock, tap, valve, or other outlet for water. In the remainder of this specification, faucet spouts may also be referred to simply as spouts.

A sink or other container is provided with a user-controlled flow control device ("flow control device" or "FDC") in addition to a faucet that controls the temperature and flow rate of the water issuing from the faucet spout. The flow control device may be mechanical, electrical, electronic, hydraulic, pneumatic, or a combination of mechanical, electrical, electronic, hydraulic, and/or pneumatic. The flow control device affects only the flow after the temperature of the water, which is a ratio of hot water to cold water, and the flow rate have been initially selected or subsequently readjusted by the user of the faucet. The activator of the flow control device could be an additional knob on the faucet, a foot, knee, waist, or thigh pedal, push bar, or button, and/or a photo or voice sensor, or some other activator device, mechanical, electrical, electronic, hydraulic, pneumatic, or otherwise. For example, the activator may be a button that is pressed with the toe or sole of the foot; or a pressure bar at the front of the sink which can be activated with the knee, hip, or stomach; or by a photoelectric or motion-sensing device; or by a voice-activated device. (For the purpose of this specification, the word "actuator" is used interchangeably to represent any or all of the aforementioned activator devices. Moreover, anywhere in the specification where the word "pedal" appears, any of the other actuators may be specified to obtain another embodiment.) In an embodiment, the default position of the flow control device is "off," i.e., when the user has not activated the flow control device, or has ceased to activate the flow control device, no water flows through the faucet.

In an embodiment, the user first opens the valves in the flow control device by activating the actuator. With the flow control device now "on," the user then sets the desired temperature and maximum flow rate by adjusting the amount of hot and cold water at the faucet. After the user has initially set, or has readjusted, the water temperature and flow, the flow control device allows the user to shut off the flow of water partially or completely without again touching the faucet by ceasing to activate, or by only partially activating, the actuator. When the user wishes to restore water flow, or to increase water flow by any amount up to the full amount set at the faucet, he or she engages the FDC actuator, which then "recalls" the temperature and maximum flow rate (or a portion thereof) to which the faucet had been previously set.

For example, if the user wishes to rinse a stack of dishes before placing them in the dishwasher, he or she would only need to initially turn on the water at the faucet to the desired temperature and flow while activating the flow control device to "on." The user rinses the first dish, then ceases to activate the flow control device, which turns the flow control device "off," which in-turn blocks the water flow to the faucet, as he or she places the dish in the dishwasher. To rinse the second dish, the user again activates the flow control device, and again water flows from the faucet at the user's desired pre-set flow and temperature. Again, while the user is placing the second dish in the dishwasher, he or she ceases to activate the flow control device and the water flow is again interrupted. The ability to turn the faucet on repeatedly at the same pre-set temperature and flow is in contrast to other pedal-type water faucets that merely substitute pedals for hand faucets. In other words, the flow control device facilitates repetitive use of the faucet at the desired flow and temperature consistently, conveniently, and easily. Also, current pedal-faucets have no ability, or only a limited ability, to make fine adjustments to the temperature or flow, thereby rendering current pedal faucets largely unsuitable for household or commercial kitchen and bathroom sinks.

Installation of the flow control device is easy and obvious, generally requiring only a wrench and screwdriver for flexible water pipes and little or no plumbing skills. For example, in a typical residential environment, the installer opens the under-sink cabinet to access the current water pipes, shuts the hot and cold water off at their respective shut-off valves, unscrews and removes the existing water pipes, screws the FDC housing onto the back wall of the under-sink cabinet, and connects new flexible water pipes from the shut-off valves to the faucet control device and from the faucet control device to the faucet. The installer then attached the cable to the rack in the flow control device and secures the cable to the walls of the cabinet so that the cable then emerges at the front of the cabinet or elsewhere at the place where the actuator will be positioned. The installer attaches the actuator to the cabinet (typically in the toe-space below the cabinet) or as elsewhere desired and then attaches the cable to the actuator. If required, the installer adjusts the travel of the cable and rack by moving the cotter pin, which attaches the cable to the rack, to one of several different positions on the rack, and/or replaces the pinions on the flow control device with different size pinions. After testing the system, the installation process is complete. After installation, the flow control device is easily accessible to the user, if, for example, the user wishes to install a new sink and/or faucet. In a commercial environment where flexible pipes are being used, the under-sink area is frequently not enclosed in a cabinet, making installation of the flow control device that much easier. Some level of expert plumbing knowledge would be necessary only in situations in which rigid water pipes are in use.

In an embodiment, the flow control device is installed on paired hot and cold water pipes that supply water to a faucet. In an embodiment, as soon as the FDC actuator is released, the water flow stops. Consequently, water is conserved, because as soon as the user ceases to activate the flow control device, water usage ceases. Alternatively, water can also be conserved when the user only partially activates the flow control device, which results in less than the pre-set maximum flow rate passing through the flow control device to the faucet.

The flow control device may be installed at any point along the water pipes that supply the faucet, so long as the flow control device is installed on both water pipes, hot and cold, that supply the faucet. Alternatively, the flow control device may be installed on a single pipe that contains both hot and cold water after the hot and cold water has been mixed. In an embodiment in which the flow control device is installed on both pipes, if the pipes are close enough together, a single flow control device may be used to control the flow of the water through both pipes. In contrast, if the pipes are separated by some distance, rendering use of a single flow control device impractical, two separate flow control devices can be installed, one on each water pipe, and both flow control devices may be connected to the same actuator or be otherwise coordinated to open and close together. Flexible or rigid water pipes may be used to connect the flow control device to the water shut-off valves, and to connect the flow control device to the faucet; however, as noted above, using rigid pipe typically requires a higher level of expertise and more time to install. The FCD actuator may be any device that activates the flow control device, thereby opening the valves and permitting water to flow. Examples include, but are not limited to: A foot pedal installed in the toe-space under a sink on which the user steps; a lever activated by moving the foot to the side, applying lateral pressure to the lever; or any of the other actuators described above. In an embodiment, the actuator may be responsive to different pressures, enabling the user to control flow by applying different amounts of pressure or otherwise activating the actuator only partially.

Figures 1, 2A, 2B, 2C:
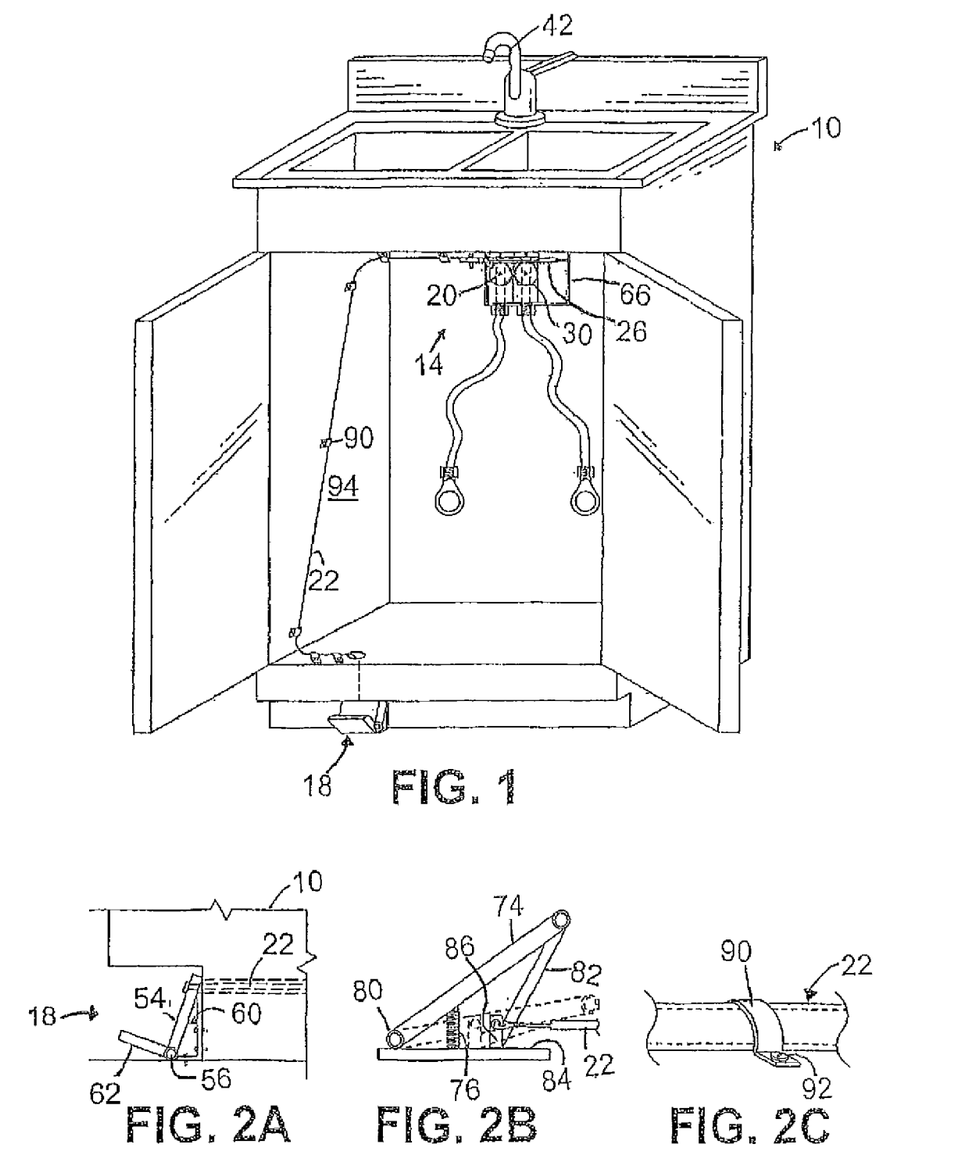
FIG. 1 is a schematic view of a sink and faucet set that has an embodiment of the invention installed within.
FIG. 2A shows a schematic view of an embodiment of the activating pedal of FIG. 1.
FIG. 2B shows a schematic view of another embodiment of the activating pedal of FIG. 1.
FIG. 2C shows a schematic view of an embodiment of the control cable that connects the activating pedal to the pinion and ball valves and one of the brackets of FIG. 1.

FIG. 1 is a schematic view of a sink 10 that has a flow control device embodiment 14 of the invention installed. As shown in FIG. 1, as a user (not shown) depresses a foot pedal 18, the foot pedal 18 pulls on a sheathered cable 22, which in turn pulls on the rack 26. As the rack 26 moves, pinions 20, 30 coupled therewith rotate, thereby opening or closing both the hot and cold water valves by way of stems 38, see also FIGS. 3A and 3B. The length and positioning of the rack 26, and the identical size of the pinions 30, assures that both valves 34 will be opened and closed functionally simultaneously and functionally to the same degree.

The diameters of the pinions 20, 30 may be close enough to one another so that one rack 26 may be used to functionally fully open and functionally fully close both ball valves 34 functionally simultaneously and functionally to the same degree. The diameters of the pinions 20, 30 may be the same within typical industrial tolerances. The valves 34 are functionally fully closed when no water leaks from a faucet spout 42 (FIG. 1) and are functionally fully opened when the water flows unrestricted through the valves 34. In an embodiment 14, moving the rack 26 six teeth 46 to the left turns the pinion 20, 30 so as to turn the ball valve stems 38 a quarter-turn to the right, fully opening the valves 34; moving the rack six teeth 46 to the left (the default position, effectuated by springs 50, 70) turns the ball valve stems 38 a quarter-turn to the left, fully closing the valves 34. In this embodiment 14, the rack 26 is, or the pinions 20, 30 are, mechanically biased to hold the valves 34 in a closed position unless and until the actuator foot pedal 18 is activated. The cable 22 functions in a manner similar to the brake cable on a bicycle (not shown). In this embodiment 14, the flow control device 14 translates the rectilinear motion of the cable 22 and rack into the rotary motion of the pinions 20, 30 and ball valve stems 38.

FIG. 2A shows a schematic view of the pedal 18 of FIG. 1. The pedal 18 of FIG. 2A includes a V-shaped piece of metal 54 that pivots on an axis 56 at the apex of the V (which is at the bend in the metal 54). A foot pedal spring 50 pulls the metal 54 towards the sink 10, elevating the portion 62 on which the user steps and which is the pedal 18 default (resting) position.

Figure 4:
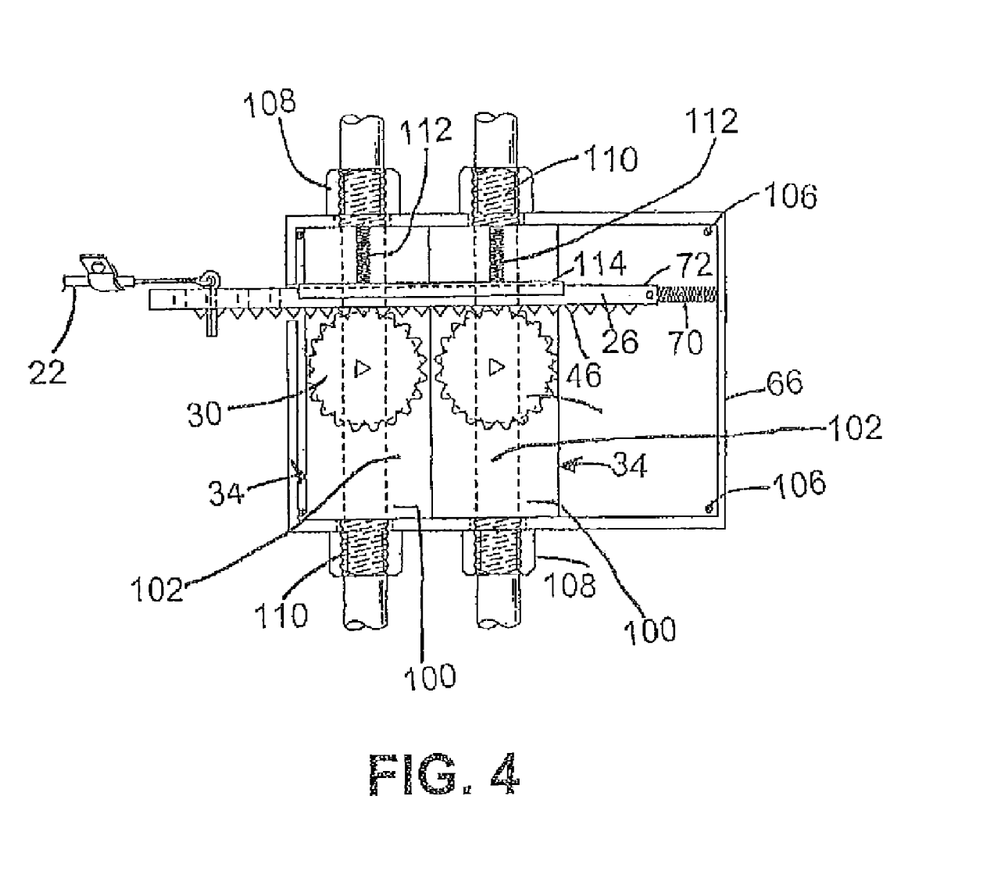
FIG. 4 shows a schematic view of an embodiment of the housing and the ball valves of FIG. 1 installed therein.

As the pedal 18 is depressed, the pedal 18 rotates away from the sink 10 and the cable 22 is pulled away from a FCD 14 housing 66, pulling the rack 26 to the left in the configurations of the drawings in FIGS. 1, 4, and 5, which, in turn, rotates the pinions 20, 30 in the direction to open the valves 34. When the pedal 18 is released, the spring 50 in the pedal 18 pulls the pedal 18 back to its default (resting) position, which pushes the cable 22 back towards the FCD 14 housing 66, which pushes the rack 26 to the right in the configurations of drawings in FIGS. 1, 4, and 5, to the rack 26 original position which, in turn, rotates the pinions 20, 30 in the direction to close the valves 34.

Alternatively, or in conjunction with the spring 50 in the pedal 18, a spring 70 attached to a distal end 72 of the rack 26 in the configurations of the drawings in FIGS. 1, 4, and 5 and to the FDC housing 66 pulls the rack 26 to the right in the configurations of the drawings in FIGS. 1, 4, and 5, to return to the rack 26 original position, which, in turn, rotates the pinions 20, 30 in an opposite direction, to reclose the valves. The springs 50, 70 bias the pedal 18 to return to and remain in the pedal 18 elevated position, which also maintains the valves 34 in their closed position, the default position of the flow control device. The spring 70 attached to the rack 26 supplements or replaces the spring 50 at the pedal 18 to bias the pedal 18 to return to and remain in the pedal 18 elevated position, which also maintains the valves 34 in their closed position, the default position of the flow control device 14.

FIG. 2B shows a schematic view of another embodiment of a pedal 74. The pedal 74 is supported by a spring 76 and is hinged 80 to a second component 82 that has its other end in a track 84 below the pedal 74. The other end of the second component 82 is also connected by a hinge to a third component 86 that is also in the track 84 and which extends upwards out of the track 84. The cable 22 is attached to the third component 86. As the pedal 74 is depressed (e.g., by a person's foot), the hinged second component 82 slides forward in the track 84, thereby moving away from the sink (not shown in FIG. 2B).

FIG. 2C shows a schematic view of an embodiment of a portion of the cable 22 and one of the brackets 90 of FIG. 1. The brackets 90 screw 92 into the walls 94 of the cabinet 10 to hold the cable 22 in place. The cable 22 easily bends, which permits it to be fastened to any wall 94 of an under-sink cabinet 10, which, in turn, permits the user to install the flow control device 14 in a manner that does not reduce or compromise the storage capacity of the under-sink cabinet 10.

Figure 3A:
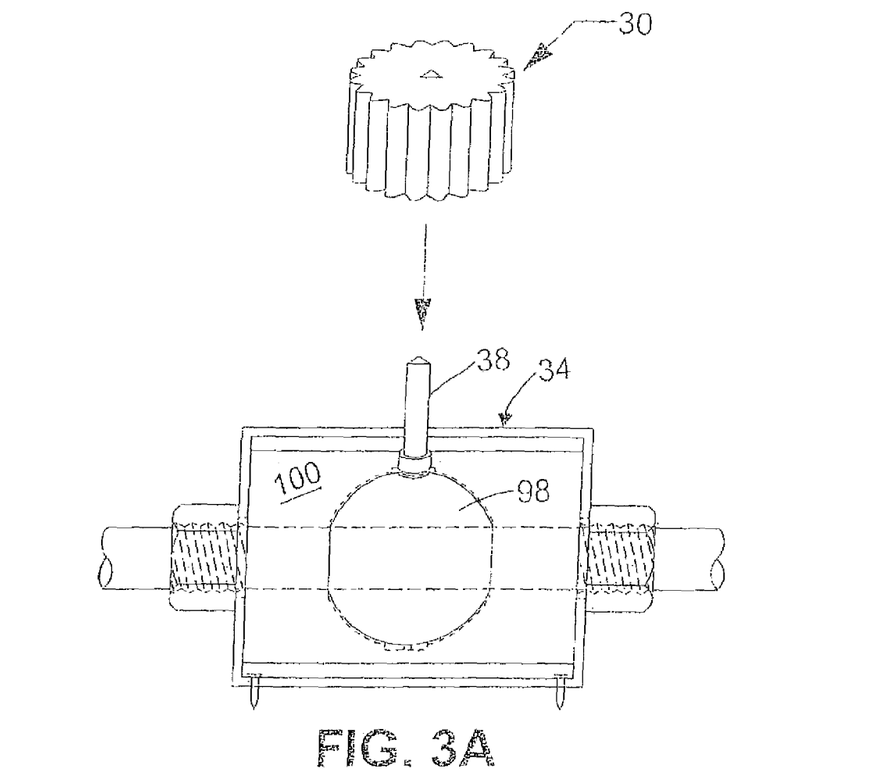
FIG. 3A shows a schematic view of an embodiment of one of the ball valves and the pinion of FIG. 1 with the valve open.

FIG. 3A shows a schematic view of one of the ball valves 34 and the pinion 30 of FIG. 1 with the valve open. The ball 98 is seated in a ball housing 100. The ball 98 is rotated within the ball housing 100 by the stem 38 connected to a removable pinion 30. The ball 98 and the ball housing 100 are fabricated with channels of functionally identical diameter.

Figure 3B:
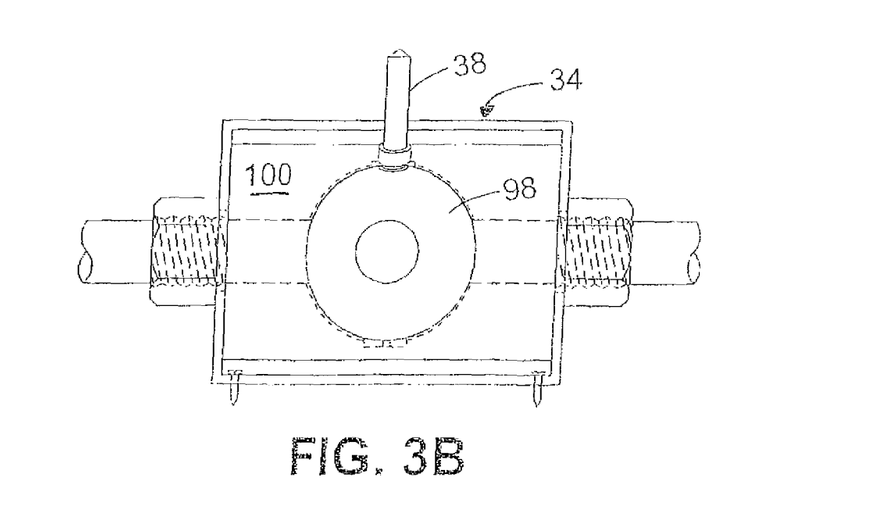
FIG. 3B shows a schematic view of an embodiment of one of the ball valves and the pinion of FIG. 1 with the valve closed.

FIG. 3B shows a schematic view of one of the ball valves 34 with the valve closed. When the ball 98 is rotated so that the channel in the ball 98 is not aligned with a channel 102 in the ball housing, as shown in FIG. 3B, all water is functionally blocked from flowing through the ball valve 34 and the flow control device 14, and no water flows from the faucet 42.

FIG. 4 shows a top view of the housing 66 containing the ball valves 34 of FIG. 1. Four screws 106 may be used to screw the housing 66 to a wall (not shown). The ball valves 34 are held in place in the housing 66 by nuts 108 that tighten down on the outside of the housing 66 to threaded nipples 110 that are part of the ball housings 100. Two top springs 112 are located above the two pinions 30, and push a track 114 within which the rack 26 slides, against the pinions 30. The two top springs 112 hold the rack 26 in positive contact with the pinions 30 to ensure that the flow control device functions properly, and, in addition, so that more than one size pinion 30 may be used.

Figure 5A:
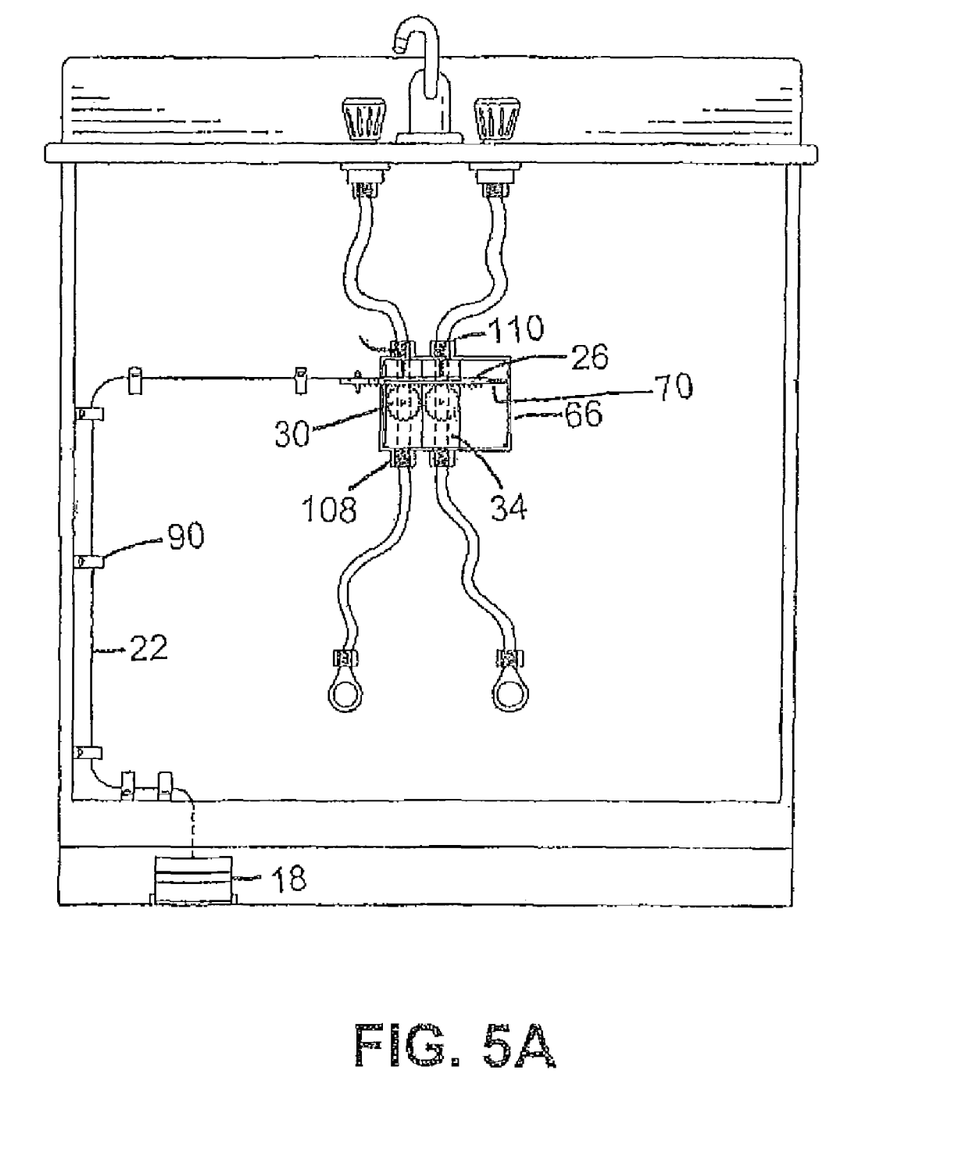
FIG. 5 is a schematic front view of another sink with a different faucet set configuration that has an embodiment of the invention installed within.

FIG. 5 is a schematic front view of another installed of the embodiment 14. FIG. 5A differs from FIG. 1 in that FIG. 1 has a single-valve/single-handle faucet set for controlling the hot and cold water, whereas the sink of FIG. 5A has a dual-valve/dual-handle faucet set for controlling the hot and cold water.

Figure 5B:
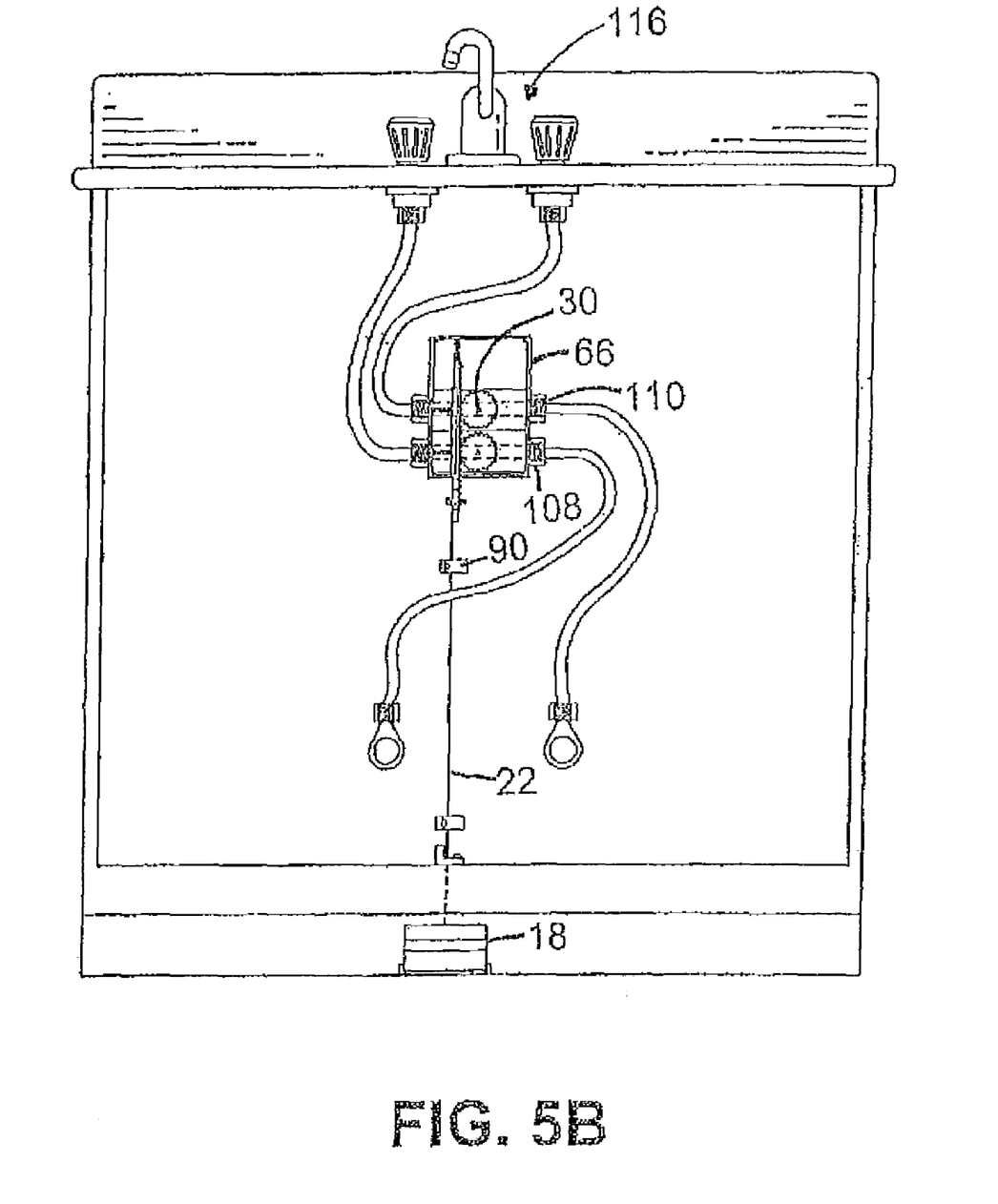
Figure 5C:
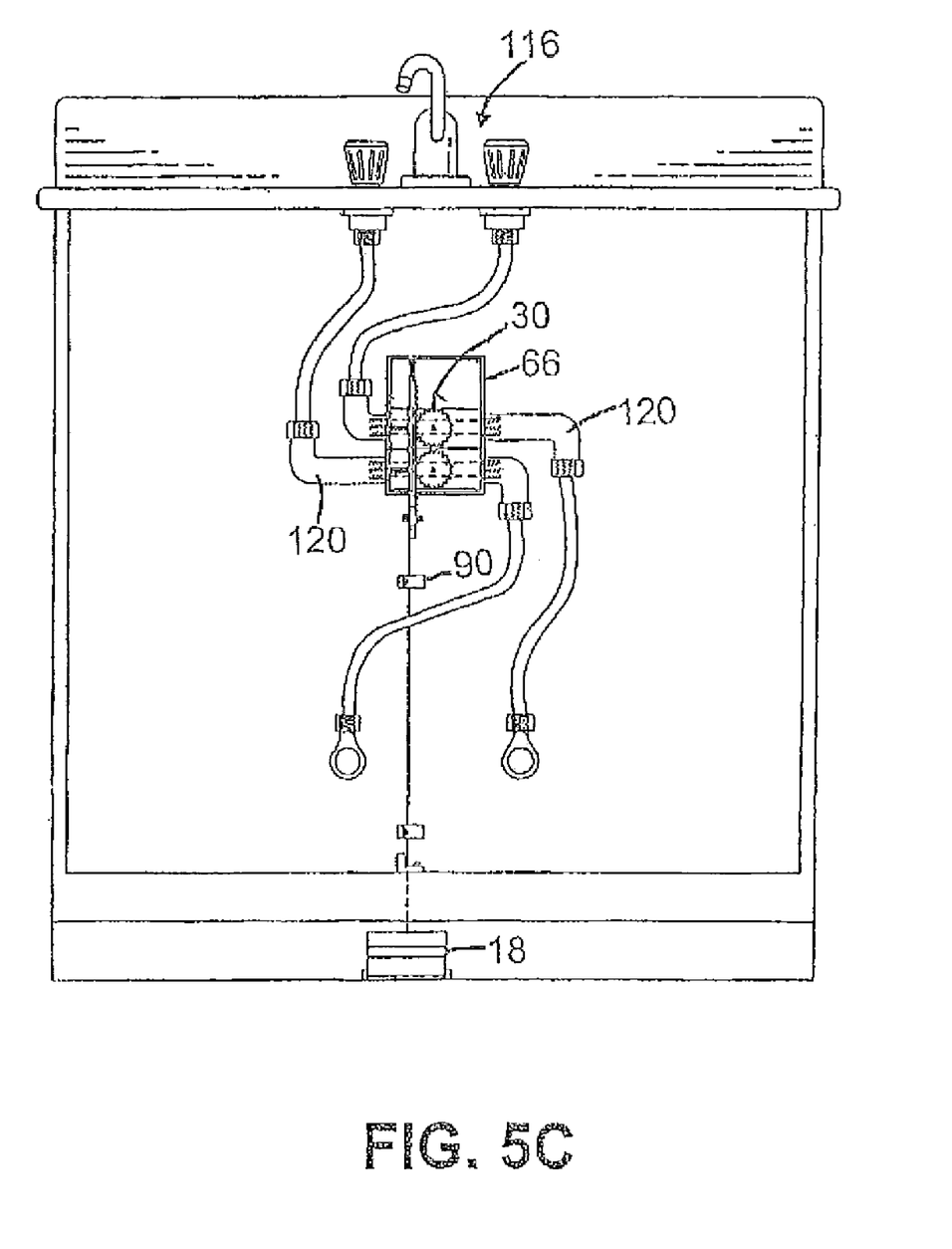

FIGS. 5B and 5C is a schematic front view of other installation of the embodiment 14. FIG. 5B differs from FIG. 1 in two ways: First, FIG. 1 has a single-valve/single-handle faucet set 42 for controlling the hot and cold water, whereas the sink of FIG. 5B has a dual-valve/dual-handle faucet set 116 for controlling the hot and cold water. Second, in FIGS. 5B and 5C, the flow control device is rotated 90° counterclockwise, the foot pedal 18 is placed directly under the flow control device 14, and the cable 22 is shortened. (Foreshortening does not permit the drawing to show the bend in the cable at the back wall of the under-sink cabinet.) FIG. 5C shows elbows 120 to facilitate installation.

Figure 6:
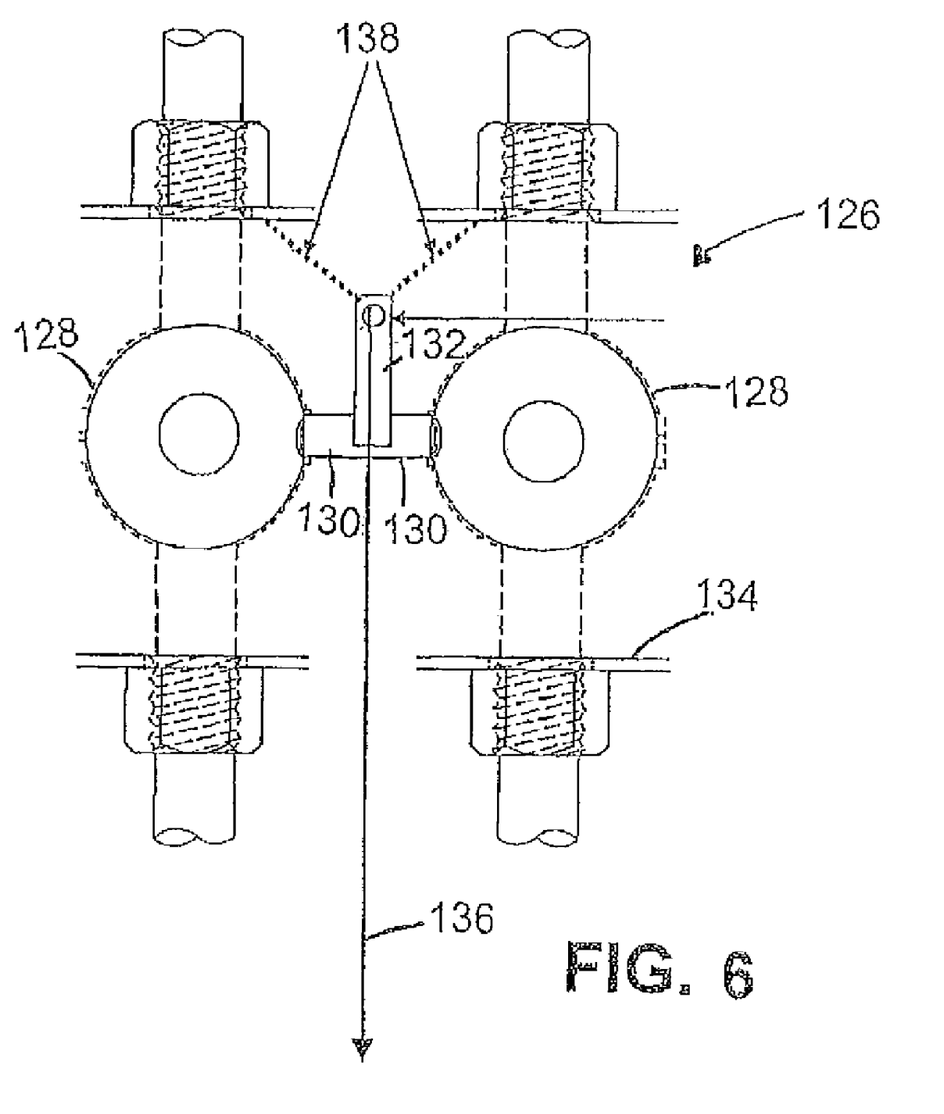
FIG. 6 is a schematic view of another embodiment of the present invention.

FIG. 6 shows another embodiment 126 in accordance with the present invention schematically showing a pair of water valves 128 having turnable stems 130 coaxially joined to enabling simultaneous rotation thereof by a lever 132 and pull 136. A housing 134 is provided for supporting both the water valves 128 and the stems.

A remote control apparatus such as foot pedal 18 (not shown with FIG. 6) is provided along with a sheathed cable for movement of the lever 132, rotation of the stems 130 and simultaneous control of water through the valves 126. Springs 138 function in identical manner to the springs 50, 70 hereinabove described in biasing the lever 132 into a position closing the valves 128 when the actuating foot pedal 15 is not depressed.

Although there has been hereinabove described a specific regulating water flow in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A water flow regulation system comprising:
   a pair of water valves having turnable stems for controlling water flow through the valves;
   a pair of pinions, one fixed to each of the valve stems;
   a toothed rack sized and configured for engagement with the pinions;
   a housing for supporting the valves and rack with teeth of both pinions engaging the rack teeth, translational movement of the rack causing simultaneous rotation of the pinions in a common rotational direction with concomitant simultaneous opening and closing of the valves, and always to the same degree relative to one another;
   a remote control disposed in a spaced apart relationship with said housing; and
   a sheathed cable interconnecting said remote control and the rack.

2. The system according to claim 1 wherein said remote control comprises a foot pedal.

3. The system according to claim 2 wherein said foot pedal incorporated a spring for moving the rack, via the cable, to close the valves upon non-depression of the foot pedal.

4. The system, according to claim 2 further comprises a spring disposed in said housing and interconnected with a distal end of the cable for moving the rack to close the valves upon release of the foot pedal.

5. The system according to claim 3 wherein the valves are ball valves.

6. A water flow regulator system comprising:
   a pair of water valves having turnable stems for controlling water flow through the valves, the stems begin coaxially joined enabling simultaneous rotation thereof;
   a housing for supporting the water valves and stems;
   a lever attached to the joined stems for simultaneous rotation of the stems in a common rotational direction and always to the same degree relative to one another;
   a remote control disposed in a spaced apart relationship with said housing; and
   a sheathed cable interconnecting said remote control and the lever.

7. The system according to claim 6 wherein said remote control comprises a foot pedal.

8. The system according to claim 7, wherein said foot pedal incorporates a spring for moving the lever, via the cable, to close the valves upon non-depression of the foot pedal.

9. The system according to claim 8 further comprising a spring disposed on said housing and interconnected with said lever for moving the lever to close the valves upon release of the foot pedal.

10. The system according to claim 6 wherein the valves are ball valves.

* * * * *